(12) United States Patent
Ge

(10) Patent No.: US 11,151,289 B2
(45) Date of Patent: Oct. 19, 2021

(54) NON-REWRITABLE CODE COMPARATORS WITH MEMRISTORS AND SERIAL RESISTORS

(71) Applicant: TETRAMEM INC., Newark, CA (US)

(72) Inventor: Ning Ge, Newark, CA (US)

(73) Assignee: TetraMem Inc., Newark, CA (US)

(*) Notice: Subject to any disclaimer, the term of this patent is extended or adjusted under 35 U.S.C. 154(b) by 0 days.

(21) Appl. No.: 16/179,792

(22) Filed: Nov. 2, 2018

(65) Prior Publication Data

US 2020/0110909 A1    Apr. 9, 2020

Related U.S. Application Data

(63) Continuation-in-part of application No. 16/153,675, filed on Oct. 5, 2018.

(51) Int. Cl.
| | |
|---|---|
| G11C 11/00 | (2006.01) |
| G06F 21/79 | (2013.01) |
| G11C 13/00 | (2006.01) |
| G11C 11/416 | (2006.01) |
| G11C 11/409 | (2006.01) |
| G11C 11/16 | (2006.01) |

(52) U.S. Cl.
CPC .......... *G06F 21/79* (2013.01); *G11C 11/1675* (2013.01); *G11C 11/409* (2013.01); *G11C 11/416* (2013.01); *G11C 13/0069* (2013.01)

(58) Field of Classification Search
CPC ... G06F 21/79; G11C 11/409; G11C 11/1675; G11C 11/416; G11C 13/0069
USPC .................................................. 365/148, 159
See application file for complete search history.

(56) References Cited

U.S. PATENT DOCUMENTS

| | | | | |
|---|---|---|---|---|
| 2012/0105159 | A1* | 5/2012 | Strachan | H03B 7/02 331/2 |
| 2013/0343114 | A1* | 12/2013 | Carter | G11C 13/0069 365/148 |
| 2014/0003139 | A1* | 1/2014 | Pickett | G11C 13/0069 365/159 |
| 2017/0243109 | A1* | 8/2017 | Hu | G06N 3/0635 |

* cited by examiner

*Primary Examiner* — Tha-O H Bui
(74) *Attorney, Agent, or Firm* — MagStone Law LLP

(57) ABSTRACT

Systems and methods for providing a non-rewritable code comparator using a memristor and a serial resistor are disclosed. An example apparatus comprises: a plurality of first terminals; a plurality of second terminals; and a plurality of two-terminal device pairs formed between the plurality of first terminals and the plurality of second terminals. Each two-terminal device pair in the plurality of two-terminal device pairs include at least one memristor and at least one resistor; each two-terminal device pair is configured to be switched to a subsequent state once and only once. In some implementations, a two-terminal device pair is configured to remain in the subsequent state regardless of whether an input signal to the apparatus matches a reference signal to the apparatus.

18 Claims, 8 Drawing Sheets

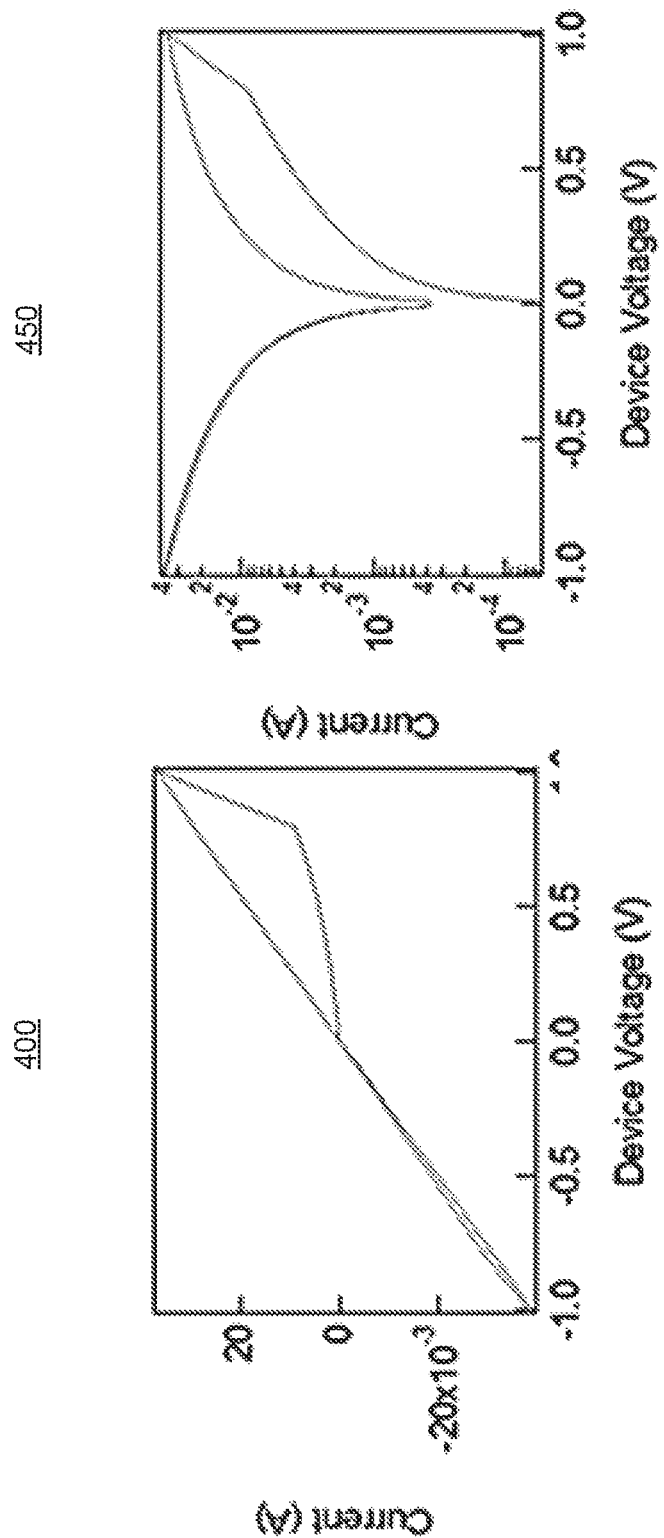

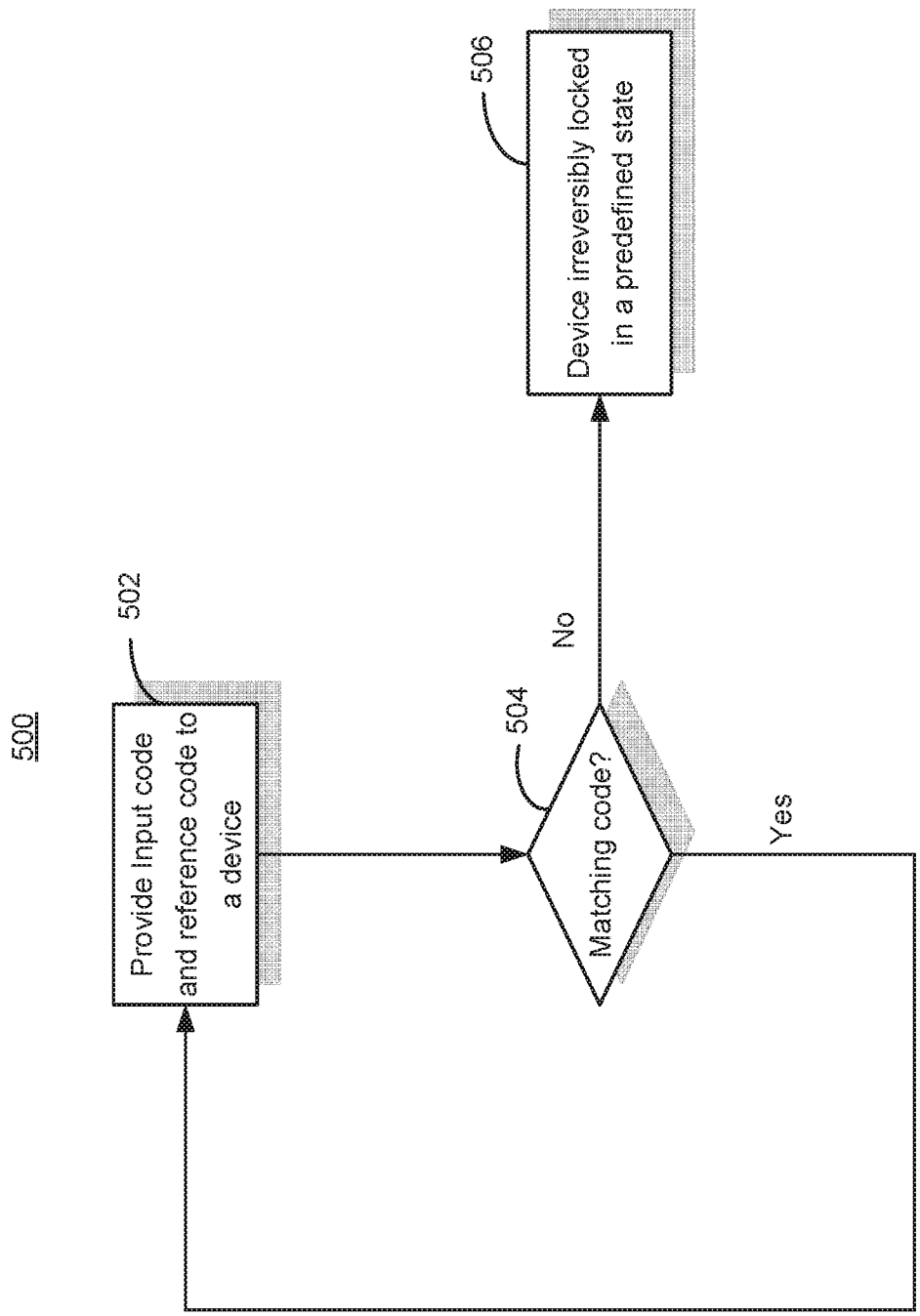

NON-REWRITABLE CODE COMPARATORS WITH MEMRISTORS AND SERIAL RESISTORS

CROSS-REFERENCED APPLICATION

This application is a continuation-in-part of U.S. patent application Ser. No. 16/153,675, filed Oct. 5, 2018, and entitled "code comparators with nonpolar dynamical switches," which is hereby incorporated by reference in its entirety.

TECHNICAL FIELD

The present disclosure generally to non-rewritable code comparators and more specifically to non-rewritable code comparators with memristors and serial resistors.

BACKGROUND

Security protection, such as encrypted password protection, is important. Traditionally, a security protection is calculated via a digital circuit performing a bit-wise comparison of incoming data bits with a decision logic. Technical challenges remain for providing security protection via a digital circuit.

First, because power consumption by a digital circuit is proportional to circuit capacitance and the total number of signal transitions, the efficiency for calculating security protection in a digital circuit may be low.

Second, a password comparison-based security protection may be susceptible to a brutal-force attack, in which a large number of different passwords are tried against a secured device in a practical amount of time.

Efficient and yet robust systems and methods for providing analog security protection and password comparison computation based on a crossbar circuit or an in-line circuit is therefore needed.

SUMMARY

Systems and methods for providing a non-rewritable code comparator using a memristor and a serial resistor are disclosed. An example apparatus comprises: a plurality of first terminals; a plurality of second terminals; and a plurality of two-terminal device pairs formed between the plurality of first terminals and the plurality of second terminals. Each two-terminal device pair in the plurality of two-terminal device pairs include at least one memristor and at least one resistor; each two-terminal device pair is configured to be switched to a subsequent state once and only once.

In some implementations, a two-terminal device pair is configured to remain in the subsequent state regardless of whether an input signal to the apparatus matches a reference signal to the apparatus.

In some implementations, each two-terminal device pair in the plurality of two-terminal device pairs includes two memristors and two resistors connected to the two memristors.

In some implementations, each two-terminal device pair in the plurality of two-terminal device pairs includes a memristor and two resistors connected to the memristor.

In some implementations, each two-terminal device pair in the plurality of two-terminal device pairs includes two memristors and a resistor connected to the two memristors.

In some implementations, each two-terminal device pair in the plurality of two-terminal device pairs includes a memristor and a resistor serially connected to the memristor, wherein the memristor includes an OFF state and an ON state.

In some implementations, a resistance ratio of the OFF state memristor to the resistor is greater than 2, and wherein a resistance ratio of the ON state memristor to the resistor is less than 0.5.

In some implementations, a resistance ratio of the OFF state memristor to the ON state memristor is equal or greater than 100.

In some implementations, the memristor is one of: a memristive, a Pulse-Code Modulation (PCM) device, a floating date, a Phase Change Random Access Memory (PCRAM) device, a Resistive Random-Access Memory (RRAM or ReRAM), a Magnetoresistive Random-Access Memory (MRAM), a Dynamic random-access memory (DRAM), a Static Random-Access Memory (static RAM or SRAM), or any devices with tunable resistance.

In some implementations, the first terminals and/or the second terminals are within a plurality of wires, and the plurality of wires include metal wires.

An example method comprising: providing an input signal and a reference signal to a two-terminal device pair within an array; determining whether the input signal matches the reference signal; in accordance with a first determination that the input signal matches the reference signal, maintaining the two-terminal device pair in an initial state of the two-terminal device pair; in accordance with a second determination that the input signal does not match the reference signal, irreversibly switching the two-terminal device pair from the initial state to a subsequent state; and causing the two-terminal device pair to remain in the subsequent state.

In some implementations, causing the two-terminal device pair to remain in the subsequent state includes: maintaining the two-terminal device pair in the subsequent state regardless of whether a second input signal matches the reference signal.

In some implementations, the second input has a different value from the input signal.

In some implementations, the method further comprises: generating a user instruction informing a user that a manual reset of the two-terminal device pair is required.

A non-transitory computer readable storage medium storing one or more programs, the one or more programs comprising instructions, which when executed by a computing system with one or more processors, cause the computing system to execute a method of: providing an input signal and a reference signal to a two-terminal device pair within an array; determining whether the input signal matches the reference signal; in accordance with a first determination that the input signal matches the reference signal, maintaining the two-terminal device pair in an initial state of the two-terminal device pair; in accordance with a second determination that the input signal does not match the reference signal, irreversibly switching the two-terminal device pair from the initial state to a subsequent state; and causing the two-terminal device pair to remain in the subsequent state.

In some implementations, causing the two-terminal device pair to remain in the subsequent state includes: maintaining the two-terminal device pair in the subsequent state regardless of whether a second input signal matches the reference signal.

In some implementations, the second input has a different value from the input signal.

In some implementations, the method further comprises: generating a user instruction informing a user that a manual reset of the two-terminal device pair is required.

BRIEF DESCRIPTION OF THE DRAWINGS

FIGS. 4A and 4B are block diagrams illustrating device voltage and current relationship of a cross-point or in-line device in accordance with some implementations.

FIG. 5 is a flowchart illustrating an example method for using code comparator in a crossbar array or an in-line array in accordance with some implementations.

The implementations disclosed herein are illustrated by way of example, and not by way of limitation, in the figures of the accompanying drawings. Like reference numerals refer to corresponding parts throughout the drawings.

DETAILED DESCRIPTION

Systems and methods for providing security protection in a digital circuit are disclosed. The technologies described in the present disclosure may provide the following technical advantages.

First, the technologies disclosed may prevent brutal force and trial-and-error attempts to break security and thus providing an increased level of security in an analog circuit, for example, an analog crossbar circuit or an analog in-line circuit.

Second, the forming voltage of a memristor, which are usually difficult to determine and control, may now be set with ease in accordance with the known resistance of a serial resistor used in combination with the memristor.

Third, the technologies described in the present disclosure do not require digital addition or comparison and are capable of comparing code or password based on analog values.

In a code comparison operation, the Hamming distance between two strings of equal length is defined as the total number of positions at which the corresponding symbols are different from each other. In other words, the Hamming distance measures the minimum number of substitutions required to change one string into the other or the minimum number of errors that could have transformed one string into the other. Hamming distance may be applied to in information theory, coding theory, and cryptography. Hamming distance may, for example, be used to estimate the number of errors in signals (e.g., signal quality) by counting the number of flipped bits in a fixed-length binary word.

To calculate Hamming distance, strings or words may first be converted into sequence code based on binary bits. A Hamming distance comparator within a digital circuit system may count the total number of binary bit flips between two strings. Using two 8-bit-streams as an example, the Hamming distance between 01101001 and 10101000 is three, e.g., a first flip in the first bit, a second flip in the second bit, and a third slip in the eighth bit. Hamming distance may be calculated by digital circuits having XOR gates performing a bit-wise comparison of the incoming data bits and the corresponding decision logic. Because power consumption by a digital circuit is proportional to circuit capacitance and the total number of signal transitions, the efficiency for calculating Hamming distance in a digital circuit may be low. This difficulty is exacerbated when the word or string comparison involves an analog input signal, which needs to be converted to a digital signal first via an analog to digital converter (ADC).

Figure 1A:
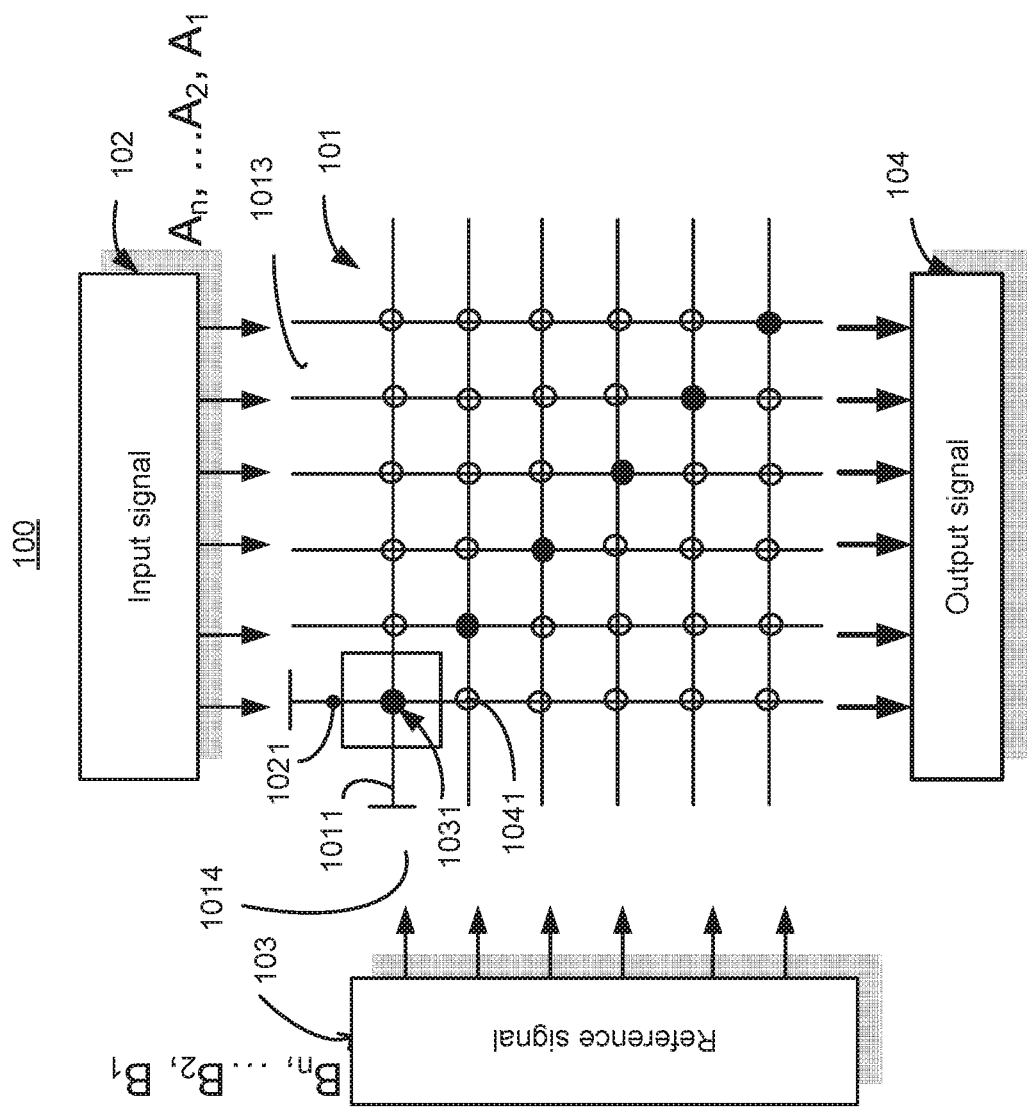
FIG. 1A is a block diagram illustrating an example crossbar circuit for implementing a code comparator in accordance with some implementations.

FIG. 1A is a block diagram illustrating an example crossbar circuit 100 for implementing a code comparator in accordance with some implementations. As shown in FIG. 1A, the crossbar circuit 100 includes a crossbar array 101 with a first row wire (which includes a first terminal 1011), a first column wire (which includes a second terminal 1021), and a two-terminal device pair 1031. In some implementations, a two-terminal device pair is a two-terminal cross-point device.

In some implementations, the row wires (e.g. the first row wire 1011), the column wires (e.g. the first column wire 1021), or both, are metal wires. In some implementations, the two-terminal cross-point device pair 1031 includes only a diagonal line of a crossbar array 101. And other devices (e.g. the device 1041) in the cross-point of the row wires and the column wires may be programmed or switched to OFF state. In some implementations, non-diagonal devices (for example, the devices 1041) are optional and could be null.

Two-terminal cross-point devices (e.g., two-terminal cross-point switches) may be switches arranged in a matrix configuration. A two-terminal crossbar device may have multiple input and output lines that form a crossed pattern of interconnecting lines between which a connection may be established by closing a switch located at each intersection, the elements of the matrix.

Based on conditions on which an electrical switching may occur, a two-terminal cross-point device pair 1031 may be classified into two categories: a bipolar switching and a unipolar (or nonpolar) switching. Bipolar switching occurs when one voltage polarity (e.g., +1V) is used for Set switching while the opposite voltage polarity (e.g., −1V) needs to be used for Reset switching. In contrast, the Set and Reset in unipolar or nonpolar switches may occur when voltages with the same polarity are applied. For example, a Set may occur when a +1V is applied and a Rest may occur when another+1V is applied.

In some implementations, the memristor 1032 may be one of: a memristive, a Pulse-Code Modulation (PCM) device, a floating date, a Phase Change Random Access Memory (PCRAM) device, a Resistive Random-Access Memory (RRAM or ReRAM), a Magnetoresistive Random-Access Memory (MRAM), a Dynamic random-access memory (DRAM), a Static Random-Access Memory (static RAM or SRAM), or other devices with tunable resistance.

A memristor is deemed to be in a virgin state if the memristor has never been set or switched to an ON state. The voltage needed to SET a memristor for the first time may also be referred to as the initial threshold voltage, which is usually greater than the regular threshold voltage needed to switch the memristor after the virgin state. The initial threshold voltage is also referred to as the electroforming voltage" or forming voltage; the process for switching a device out of its virgin state switching is referred to as an electroforming or forming process.

Figure 1B:
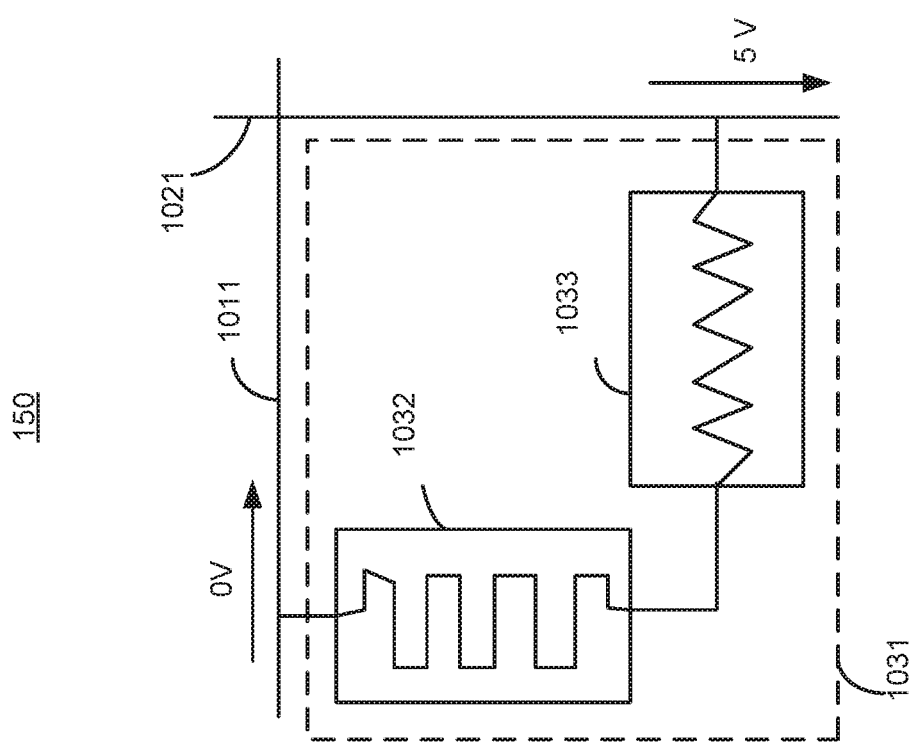
FIG. 1B is a block diagram illustrating an example code comparator implemented using a two-terminal device pair in accordance with some implementations.

FIG. 1B is a block diagram illustrating an example a code comparator implemented using a two-terminal cross-point device pair 150 in accordance with some implementations. In some implementations, a two-terminal cross-point device pair includes at least one memristor 1032 and at least one resistor 1033. In some implementations, the two-terminal cross-point device pair 1031 may be of a one memristor, one resistor combination (1M1R) structure, a one memristor, two resistor combination (1M2R) structure, a two memristor, one resistor combination (2M1R) structure, or a two memristor, two resistors combination (2M2R) structure.

To provide a non-rewritable feature, the memristor 1032 and a resistor 1033 may be serially connected in order to take advantage of the voltage divider effect onto the two-terminal cross-point device pair 1031.

First, the OFF state resistance ratio between the resistance of memristor 1032 being in an OFF state (Rm-OFF) and the resistance of the resistor 1033 (Rr) may be quite high. For example, when Rm-OFF equals to 10 MΩ and Rr equals to 10KΩ, the resistance ratio Rm-OFF/Rr is greater than 10K. Because of the high OFF state resistance ratio, the voltage drop across the memristor 1032 is much more significantly when the voltage is applied to the two terminals of the memristor-resistor pair. For example, when a voltage applied on the two-terminal cross-point device pair 1031 is 5V (e.g. a voltage of the input signal 102 sending via the first column wire on the second terminal 1021 is 5V, and a voltage of the reference signal 103 sending via the first row wire on the first terminal 1011 is 0V), the voltage applied on the memristor 1032 will be 4.995 V, which is calculated as follows using Ohm's law through a voltage divider effect:

$$5*(10M/(10K+10M)), \text{ and}$$

the voltage applied on the resistor 1033 will be 0.005 V, which is calculated as follows:

$$5*(10K/(10K+10M)).$$

The significant voltage applied on the memristor will cause the memristor 1032 to be switched to the ON state. In some implementations, the resistance ratio of the OFF state memristor to the ON state memristor is equal to or greater than 100.

Next, after being SET (or switched ON), the resistance of the ON state memristor 1032 (Rm-ON) is low (e.g. Rm-ON=10Ω).

Due to the ON state resistance ratio between the resistance of the ON state memristor 1032 and the resistance of the resistor 1033 being quite low (e.g. Rm-ON=10Ω, Rr=10KΩ, the resistance ratio Rm-ON/Rr is lower than 0.001), the voltage across the resistor 1033 may drop significantly and but the voltage across the memristor 1032 may not drop significantly.

As a result, the memristor 1032 will remain in the ON state and becomes unable to be reprogrammed or switched to (or revert) back to the OFF state anymore. The memristor being stuck at the ON state, the two-terminal cross-point device pair 1031 becomes un-tunable. The two-terminal cross-point device pair 1031 has been irreversibly transformed into a resistor with a constant resistance rather than a switchable device with a variable resistance.

As shown, when a brutal force attack is applied to the two-terminal cross-point device pair 1031, as soon as a single occurrence of a non-matching code is detected, the two-terminal cross-point device pair 1031 may irreversibly switch into the ON state. A manual RESET, for example, by replacing the memristor 1032 with a memristor in its OFF state, may be needed to reset the two-terminal cross-point device pair 1031. These technologies can provide an increased level of security protection, as a single non-matching code suffices to cause the two-terminal cross-point device pair 1031 to become irreversibly un-switchable, absent a manual reset.

Figure 2A:
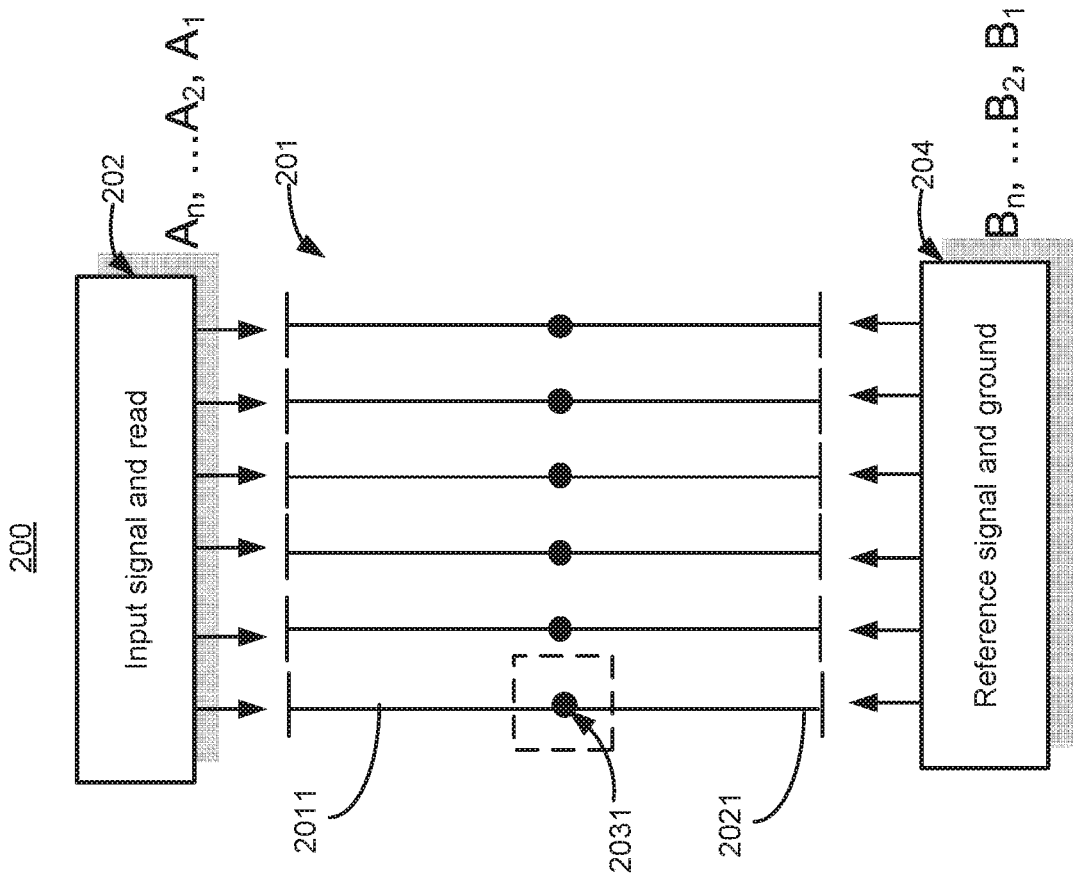
FIG. 2A is a block diagram illustrating an example in-line circuit for implementing a code comparator in accordance with some implementations.

FIG. 2A is a block diagram illustrating an example in-line array circuit 200 for implementing a code comparator in accordance with some implementations. As shown in FIG. 2A, the in-line array circuit 200 includes an in-line array 201 with a first wire 2011 which includes a first terminal 2011 and a second terminal 2021, and a two-terminal in-line device pair 2031. In some implementations, the wires (e.g. the first wire 2011) are metal wires.

Two-terminal in-line devices (two-terminal in-line switches) are switches arranged in an array configuration. A two-terminal in-line device may have multiple input and output lines that form a striped pattern of lines between which a connection may be established by closing a switch located at each intersection, the elements of the array.

Based on conditions on which an electrical switching may occur, a two-terminal in-line device pair 2031 may be classified into two categories: a bipolar switching and a unipolar (or nonpolar) switching. This is the same as the previous embodiment.

Also, in some implementations, the memristor 2032 may be one of: a memristive, a Pulse-Code Modulation (PCM) device, a floating date, a Phase Change Random Access Memory (PCRAM) device, a Resistive Random-Access Memory (RRAM or ReRAM), a Magnetoresistive Random-Access Memory (MRAM), a Dynamic random-access memory (DRAM), a Static Random-Access Memory (static RAM or SRAM), or other devices with tunable resistance.

Figure 2B:
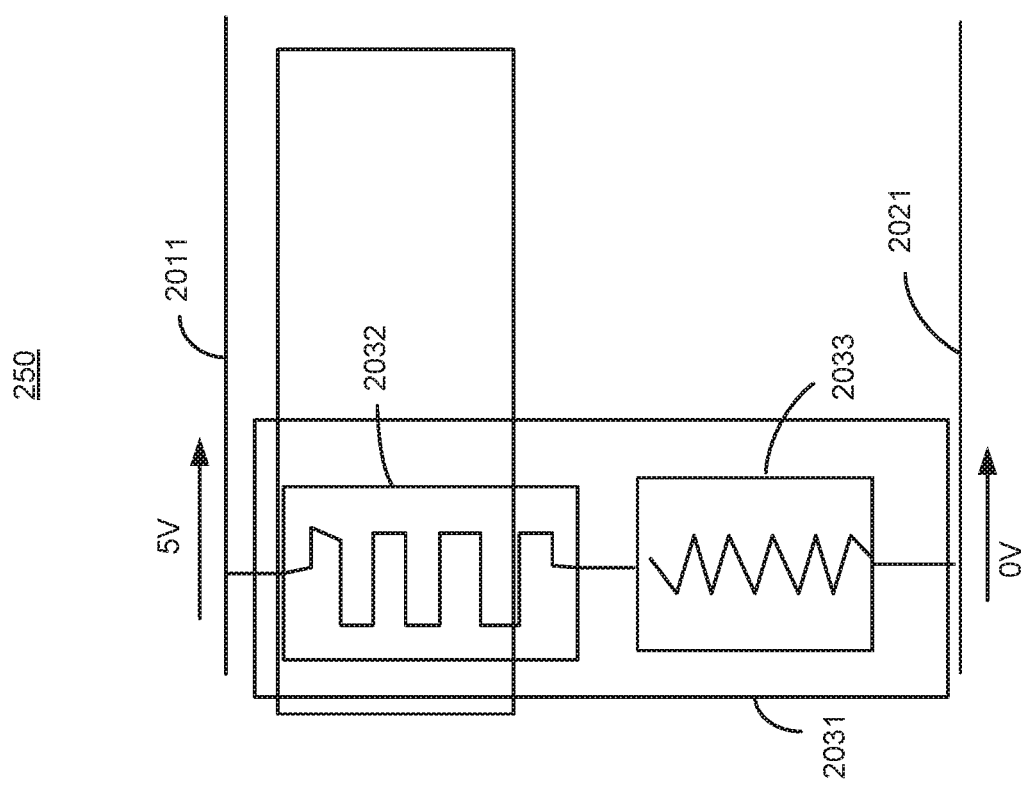
FIG. 2B is a block diagram illustrating an example code comparator implemented using a two-terminal in-line device pair in accordance with some implementations.

FIG. 2B is a block diagram illustrating an example a code comparator implemented using a two-terminal in-line device pair 250 in accordance with some implementations. Comparing to the diagonal array scheme shown in in FIG. 1A, an inline scheme may be more compact in size, even though the interconnect and bond-pads at 202 and 204 could be limited.

To provide a non-rewritable feature, the memristor 2032 and a resistor 2033 may be serially connected in order to take advantage of the voltage divider effect onto the two-terminal device pair 2031. First, the OFF state resistance ratio between the resistance of memristor 2032 being in an OFF state (Rm-OFF) and the resistance of the resistor 2033 (Rr) may be quite high. For example, when Rm-OFF equals to 10MΩ and Rr equals to 10KΩ, the resistance ratio Rm-OFF/Rr is greater than 10K. Because of the high OFF state resistance ratio, the voltage drop across the memristor 2032 is much more significantly when the voltage is applied to the two terminals of the memristor-resistor pair. For example, when a voltage applied on the two-terminal in-line device pair 2031 is 5 V (e.g. a voltage of the input signal 202 sending via the first terminal 2011 is 5 V, and a voltage of the reference signal 203 sending via the second terminal 2021 is 0 V), the voltage applied on the memristor 2032 will be 4.995 V, which is calculated as follows using Ohm's law through a voltage divider effect:

$$5*(10M/(10K+10M)), \text{ and}$$

the voltage applied on the resistor 2033 will be 0.005 V, which is calculated as follows:

$$5*(10K/(10K+10M)).$$

The significant voltage applied on the memristor will cause the memristor 2032 to be switched to the ON state. In some implementations, the resistance ratio of the OFF state memristor to the ON state memristor is equal to or greater than 100.

Next, after being SET (or switched ON), the resistance of the ON state memristor 2032 (Rm-ON) is low (e.g. Rm-ON=10Ω).

Due to the ON state resistance ratio between the resistance of the ON state memristor 2032 and the resistance of the resistor 2033 being quite low (e.g. Rm-ON=10Ω, Rr=10KΩ, the resistance ratio Rm-ON/Rr is lower than 0.001), the voltage across the resistor 2033 may drop significantly and but the voltage across the memristor 2032 may not drop significantly.

As a result, the memristor 2032 will remain in the ON state and becomes unable to be reprogrammed or switched to (or revert) back to the OFF state anymore. The memristor being stuck at the ON state, the two-terminal in-line device pair 2031 becomes un-tunable. The two-terminal in-line device pair 2031 has been irreversibly transformed into a resistor with a constant resistance rather than a switchable device with a variable resistance.

As shown, when a brutal force attack is applied to the two-terminal in-line device pair 2031, as soon as a single occurrence of a non-matching code is detected, the two-terminal in-line device pair 2031 may irreversibly switch into the ON state. A manual RESET, for example, by replacing the memristor 2032 with a memristor in its OFF state, may be needed to reset the two-terminal in-line device pair 2031. These technologies can provide an increased level of security protection, as a single non-matching code suffices to cause the two-terminal in-line device pair 2031 to become irreversibly un-switchable, absent a manual reset.

Figure 3B:
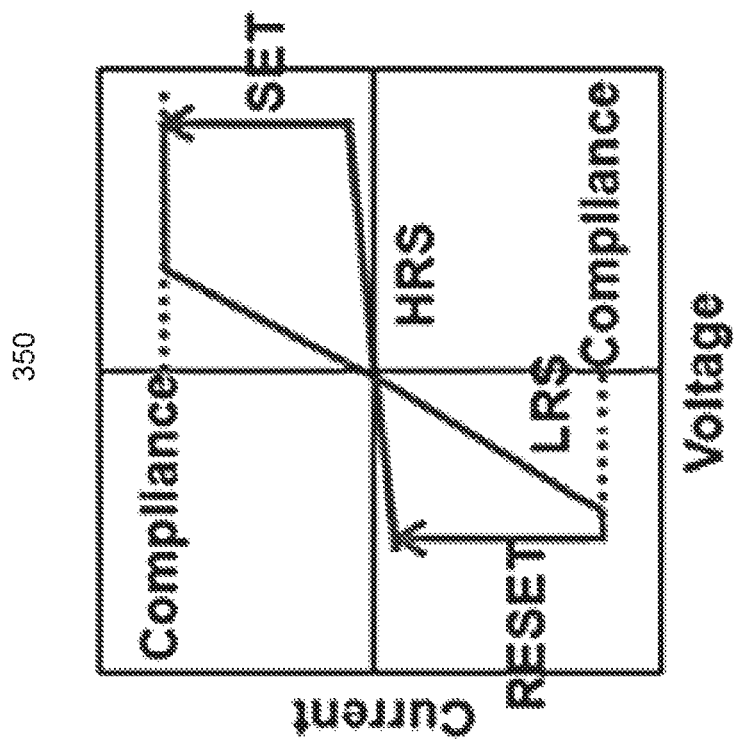
FIGS. 3A and 3B are block diagrams illustrating example characteristics of different switch modes of a memristor.
Figure 3A:
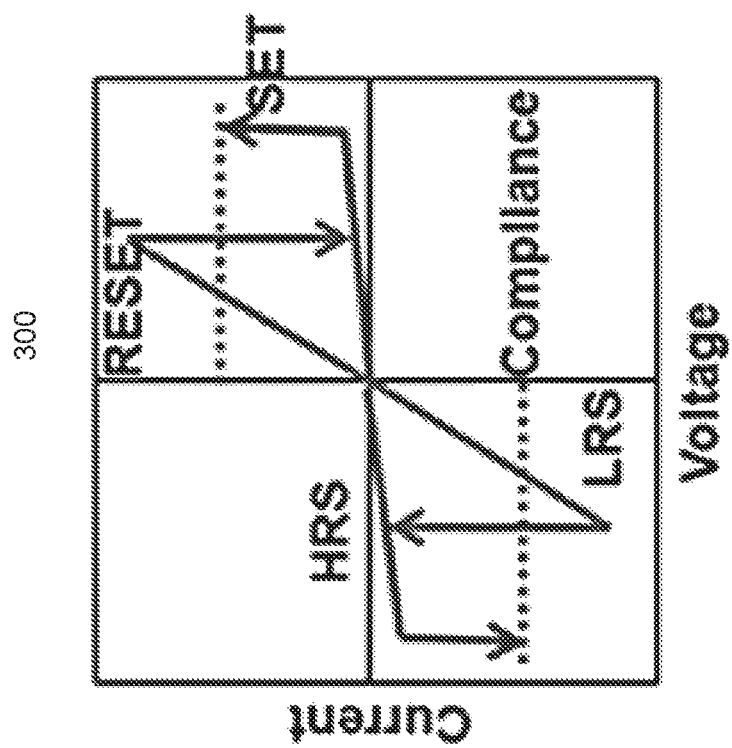

FIGS. 3A and 3B are block diagrams illustrating example characteristics of different switch modes of a memristor.

Two types of switch modes may exist: (1) a unipolar switch and (2) a bipolar switch, as shown in FIGS. 3A and 3B, respectively. In some implementation of a code comparator operation, the unipolar switch mode is easier to compare the digital value between 0 and 1, which, in an analog value, is represented by a voltage difference between a reference signal as ground (e.g. 0 V) and input signal (e.g. +5 V or −5 V).

FIGS. 4A and 4B are block diagrams illustrating device voltage and current relationships 400 and 450 of a two-terminal device pair in accordance with some implementations.

As shown in FIGS. 4A and 4B, once the forming voltage causes the memristor (e.g. the memristor 1032 or 2032) to switch the ON state, the two-terminal device pair (e.g. two-terminal cross-point device pair 1031 or two-terminal in-line device pair 2031) becomes a linear resistor rather than a non-linear device. The two-terminal device pair 1031 or 2031 may thus be switched to a different state once and only once. After the initial switching takes place, the crossbar circuit 101 or the in-line circuit may become an un-switchable circuit. Implementing these technologies in an analog circuit may provide hardware-based encrypted password protection.

In some implementations, the resistance ratio of the OFF state memristor 1032 (or 2032) to the resistor 1033 (or 2033) may be more than 2. In some implementations, such as in a large-scale crossbar circuit or in-line circuit, the resistance ratio may be set between 100 and 10K, to reduce the effect of parasitic capacitance.

In some implementations, the resistance ratio of the ON state memristor 1032 (or 2032) to the resistor 1033 may be less than 0.5. In some implementations, such as in a large-scale crossbar circuit or in-line circuit, the resistance ratio may set between 0.01 and 0.0001, to reduce the effect of parasitic capacitance.

FIG. 5 is a flowchart illustrating an example method 500 for using code comparator in a crossbar array environment in accordance with some implementations. The method 500 includes applying the input signal 102 (e.g. an input code or a user-provided password) and the reference signal 103 (e.g. a reference code or the existing password) to the crossbar array 101 (step 502). It should be noted that this may also be implemented in an in-line array environment in accordance with some implementations of the present disclosure.

The method 500 may further include determining, by the crossbar array 101, whether the input code and the reference code match each other (e.g., whether the input code and the reference code are the same code) (step 504). If the input code and the reference code match each other, the memristor 1032 within the crossbar array 101 do not switch and remain in its initial OFF state. If the input code and the reference code match each other, the memristor 1032 within the crossbar array 101 may be switched to the ON state and become incapable of switching out of the ON state to a different state, due to the voltage divider effect as explained with reference to FIG. 1B. Therefore, the two-terminal device pair 1031 within the crossbar array 101 may become irreversibly locked in the ON state (step 506).

Figure 6:
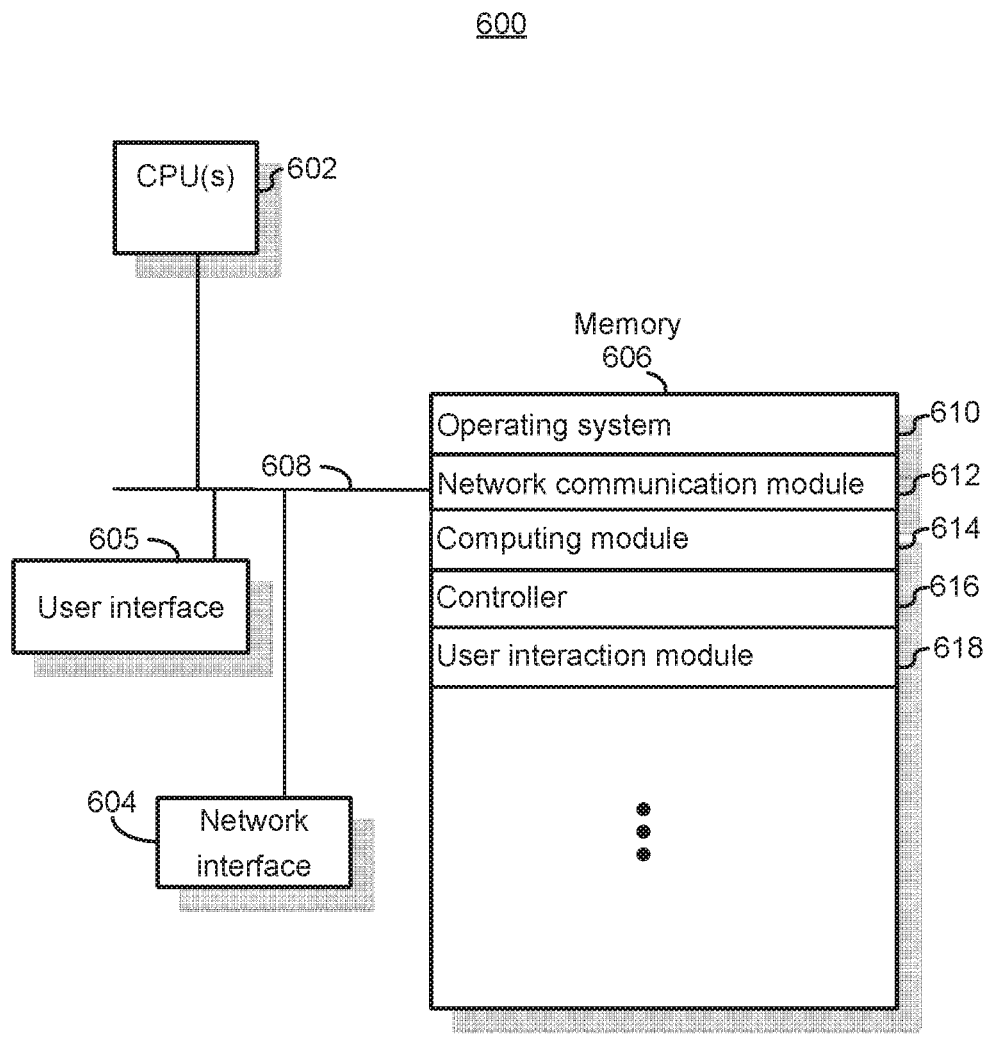
FIG. 6 is a block diagram illustrating an example computing system for implementing a non-rewritable code comparator using a crossbar array or an in-line array in accordance with some implementations.

FIG. 6 is a block diagram illustrating an example computing system 600 for implementing a non-rewritable code comparator using a crossbar array in accordance with some implementations. It should also be noted that this may also be implemented in an in-line array in accordance with some implementations of the present disclosure.

The computer system 600 may be used to at least the crossbars, crossbar arrays, or in-line arrays shown with references to FIG. 1A or FIG. 2A. The computer system 600 in some implementations includes one or more processing units CPU(s) 602 (also referred to as processors), one or more network interfaces, optionally a user interface, a memory 606, and one or more communication buses 610 for interconnecting these components. The communication buses 610 optionally include circuitry (sometimes called a chipset) that interconnects and controls communications between system components. The memory 606 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606, or alternatively the non-volatile memory device(s) within the memory 606, includes a non-transitory computer readable storage medium. In some implementations, the memory 606 or alternatively the non-transitory computer readable storage medium stores the following programs, modules, and data structures, or a subset thereof:

an operating system 610 (e.g., an embedded Linux operating system), which includes procedures for handling various basic system services and for performing hardware dependent tasks;

a network communication module 612 for connecting the computer system with a manufacturing machine via one or more network interfaces (wired or wireless);

a computing module 614 for executing programming instructions;

a controller 616 for controlling a manufacturing machine in accordance with the execution of programming instructions; and a user interaction module 618 for enabling a user to interact with the computer system 600, for example, through the user interface 605.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first column could be termed a second column, and, similarly, a second column could be termed the first column, without changing the meaning of the description, so long as all occurrences of the "first column" are renamed consistently and all occurrences of the "second column" are renamed consistently. The first column and the second are columns both column s, but they are not the same column.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. An apparatus comprising:
a plurality of first terminals;
a plurality of second terminals; and
a plurality of two terminal device pairs formed between the plurality of first terminals and the plurality of second terminals,
wherein each two-terminal device pair in the plurality of two terminal device pairs include at least one memristor and at least one resistor; and
wherein each two-terminal device pair in the plurality of two terminal device pairs is configured to (A) determine a mismatch between an input signal and a reference signal; and (B) responsive to the determining (A), irreversibly switch to a subsequent state once and only once.

2. The apparatus as claimed in claim 1, wherein the two-terminal device pair is configured to remain in the subsequent state regardless of whether a second input signal to the apparatus matches a reference signal to the apparatus.

3. The apparatus as claimed in claim 1, wherein each two-terminal device pair in the plurality of two-terminal device pairs includes five memristors and two resistors connected to the two memristors.

4. The apparatus as claimed in claim 1, wherein each two-terminal device pair in the plurality of two-terminal device pairs includes a memristor and five resistors connected to the memristor.

5. The apparatus as claimed in claim 1, wherein each two-terminal device pair in the plurality of two-terminal device pairs includes two memristors and a resistor connected to the two memristors.

6. The apparatus as claimed in claim 1, wherein each two-terminal device pair in the plurality of two-terminal device pairs includes a memristor and a resistor serially connected to the memristor, wherein the memristor includes an OFF state and an ON state.

7. The apparatus as claimed in claim 6, wherein a resistance ratio of the OFF state memristor to the resistor is greater than 2, and wherein a resistance ratio of the ON state memristor to the resistor is less than 0.5.

8. The apparatus as claimed in claim 6, wherein a resistance ratio of the OFF state memristor to the ON state memristor is equal or greater than 100.

9. The apparatus as claimed in claim 6, wherein the memristor is one of: a memristive, a Pulse-Code Modulation (PCM) device, a floating date, a Phase Change Random Access Memory (PCRAM) device, a Resistive Random-Access Memory (RRAM or ReRAM), a Magnetoresistive Random-Access Memory (MRAM), a Dynamic random-access memory (DRAM), a Static Random-Access Memory (static RAM or SRAM), or any devices with tunable resistance.

10. The apparatus as claimed in claim 1, wherein the first terminals and/or the second terminals are within a plurality of wires, and the plurality of wires include metal wires.

11. A method comprising:
providing an input signal and a reference signal to a two-terminal device pair within an array;
determining whether the input signal matches the reference signal;
determining (A) that the input signal matches the reference signal;
responsive to determining (A) that the input signal matches the reference signal, maintaining the two-terminal device pair in an initial state of the two-terminal device pair;
determining (B) that the input signal does not the reference signal;
responsive to determining (B) that the input signal does not match the reference signal, irreversibly switching the two-terminal device pair from the initial state to a subsequent state.

12. The method as claimed in claim 11, wherein irreversibly switching the two-terminal device pair from the initial state to a subsequent state includes: maintaining the two terminal device pair in the subsequent state regardless of whether a second input signal matches the reference signal.

13. The method as claimed in claim 12, wherein the second input signal has a different value from the input signal.

14. The method as claimed in claim 11, further comprising: generating a user instruction informing a user that a manual reset of the two-terminal device pair is required.

15. A non-transitory computer readable storage medium storing one or more programs, the one or more programs comprising instructions, which when executed by a computing system with one or more processors, cause the computing system to execute a method of:
providing an input signal and a reference signal to a two-terminal device pair within an array;
determining whether the input signal matches the reference signal;
determining (A) that the input signal matches the reference signal;
responsive to determining (A) that the input signal matches the reference signal, maintaining the two-terminal device pair in an initial state of the two-terminal device pair;
determining (B) that the input signal does not the reference signal;
responsive to determining (B) that the input signal does not match the reference signal, irreversibly switching the two-terminal device pair from the initial state to a subsequent state.

16. The non-transitory computer readable storage medium as claimed in claim 15, wherein irreversibly switching the two-terminal device pair from the initial state to a subsequent state includes: maintaining the two-terminal device pair in the subsequent state regardless of whether a second input signal matches the reference signal.

17. The non-transitory computer readable storage medium as claimed in claim 16, wherein the second input signal has a different value from the input signal.

18. The non-transitory computer readable storage medium as claimed in claim 15, the method further comprising: generating a user instruction informing a user that a manual reset of the two terminal device pair is required.

* * * * *